United States Patent
Shi et al.

(10) Patent No.: US 9,155,152 B2
(45) Date of Patent: Oct. 6, 2015

(54) INTENSITY CONTROL OF LEDS INTERFACING THREE-WAY SOCKETS

(71) Applicant: Dialog Semiconductor Inc., Campbell, CA (US)

(72) Inventors: Nan Shi, Newark, CA (US); Liang Yan, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 14/617,685

(22) Filed: Feb. 9, 2015

(65) Prior Publication Data

US 2015/0156844 A1 Jun. 4, 2015

Related U.S. Application Data

(63) Continuation of application No. 13/931,339, filed on Jun. 28, 2013, now Pat. No. 9,006,997.

(51) Int. Cl.
*H05B 33/08* (2006.01)

(52) U.S. Cl.
CPC .................................. *H05B 33/0845* (2013.01)

(58) Field of Classification Search
USPC ........ 315/209 R, 291, 294, 297, 307, 208, 312
See application file for complete search history.

(56) References Cited

U.S. PATENT DOCUMENTS

2012/0235586 A1* 9/2012 Lenk ............................ 315/201

* cited by examiner

*Primary Examiner* — Douglas W Owens
*Assistant Examiner* — Jonathan Cooper
(74) *Attorney, Agent, or Firm* — Fenwick & West LLP

(57) ABSTRACT

A light-emitting diode (LED) lighting fixture is configured to interface a three-way socket and provide at least two levels of output light intensity. A detection unit determines whether one or both input voltages lines of the three-way socket are active and provides a control signal to an LED controller indicating which input voltage lines are active. The LED controller is configured to provide different output current levels to an LED bank based on whether one or both input voltage lines are active. By adjusting the output current level based on which input lines are active, the LED lighting fixture provides at least two output lighting intensity levels. LED lighting fixtures according to various embodiments can therefore serve as a direct replacement for three-way incandescent bulbs.

8 Claims, 4 Drawing Sheets

INTENSITY CONTROL OF LEDS INTERFACING THREE-WAY SOCKETS

CROSS-REFERENCE TO RELATED APPLICATION

This application is a continuation of U.S. patent application Ser. No. 13/931,339, filed Jun. 28, 2013, which is incorporated herein by reference in its entirety.

BACKGROUND

1. Field of the Invention

The present invention relates to driving LED (Light-Emitting Diode) lighting fixtures and, more specifically, to controlling light intensity of LED lighting fixtures interfacing three-way sockets.

2. Description of the Related Arts

LEDs are being adopted in a wide variety of electronics applications, for example, architectural lighting, automotive head and tail lights, backlights for liquid crystal display devices, flashlights, etc. Compared to conventional lighting sources such as incandescent lamps and fluorescent lamps, LEDs have significant advantages, including high efficiency, good directionality, color stability, high reliability, long life time, small size, and environmental safety.

The use of LEDs in lighting applications is expected to expand, as they provide significant advantages over incandescent lamps (light bulbs) in power efficiency (lumens per watt) and spectral quality. Furthermore, LED lighting fixtures represent lower environmental impact compared to fluorescent lighting systems (fluorescent ballast combined with fluorescent lamp) that may cause mercury contamination as a result of fluorescent lamp disposal.

Conventional three-way incandescent bulbs contain two filaments, a low-power filament and a high-power filament. A three-way Edison socket controls output light intensity of the bulb using two AC voltage input lines. Specifically, a low-intensity setting is created by activating only the first input line, which is connected to the low-power filament of the incandescent bulb. For a medium-intensity setting, the three-way socket activates the second input line, which is coupled to the high-power filament. For a high-intensity setting, both input lines are activated.

However, when an LED lighting fixture is used in a three-way socket in place of a conventional incandescent bulb, multiple filaments are not available for providing different output light intensities. One solution to this compatibility problem uses two banks of LEDs, each connected to the output of a different single-channel LED controller or a different output of a multi-channel LED controller. The LED controller(s) take input voltage lines of the three-way socket and supply power to LED banks However, the additional wire used to connect one of the LED banks to the second input line increases the manufacturing cost of the LED lighting fixture. Furthermore, illuminating different LED banks for different intensity settings causes uneven light distribution. Light may be redistributed using complex LED layouts or a diffusing lens, but these solutions add complexity and increase manufacturing costs for the LED lighting fixture.

SUMMARY

Embodiments described herein include a system and method for controlling output intensity of LED lighting fixtures interfacing three-way sockets. Three-way sockets include two input voltage lines for providing three levels of output light intensity. Depending on a desired output light intensity, one or both input voltage lines may be activated. An LED lighting fixture according to various embodiments detects whether one or both input voltage lines are active, and adjusts a level of regulated current provided to LEDs based on the detection.

In one embodiment, an LED lighting fixture configured to receive signals from a first input voltage line and a second input voltage line includes an LED bank and an LED controller. The LED bank includes one or more LEDs. The LED controller is configured to detect whether the first and second input voltage lines are active. If the first input voltage line is active and the second input voltage line is not active, the LED controller is configured to provide regulated output current at a first level to a first portion of the LED bank. If the first and second input voltage lines are active, the LED controller is configured to provide regulated output current at a second level to a second portion of the LED bank. The second portion of the LED bank at least partially overlaps the first portion.

By adjusting the level of current provided to the LED bank in response to the active input voltage lines of the three-way socket, an LED lighting fixture according to embodiments described herein can be a direct replacement of a three-way incandescent bulb.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

As will be explained in more detail below with reference to the figures, the LED lighting system and a method according to various embodiments (1) detects whether one or both input voltage lines of a three-way socket are active (that is, having a voltage above or below a threshold voltage), (2) generates lighting level control signals based on the input lines determined to be active, and (3) provides corresponding output drive current to the LEDs in the LED lighting fixture based on the lighting control signals to achieve the desired light intensity of the LEDs. In various embodiments, the LED lighting fixture system provides three discrete levels of output drive current. Because LEDs are current controlled devices, regulating their current effectively regulates their brightness. Accordingly, by adjusting the output drive current to one of three levels responsive to the detected input lines, the LED lighting fixture provides three output lighting intensities levels. LED lighting fixtures according to embodiments described herein can therefore serve as a direct replacement for three-way incandescent bulbs.

Figure 1:
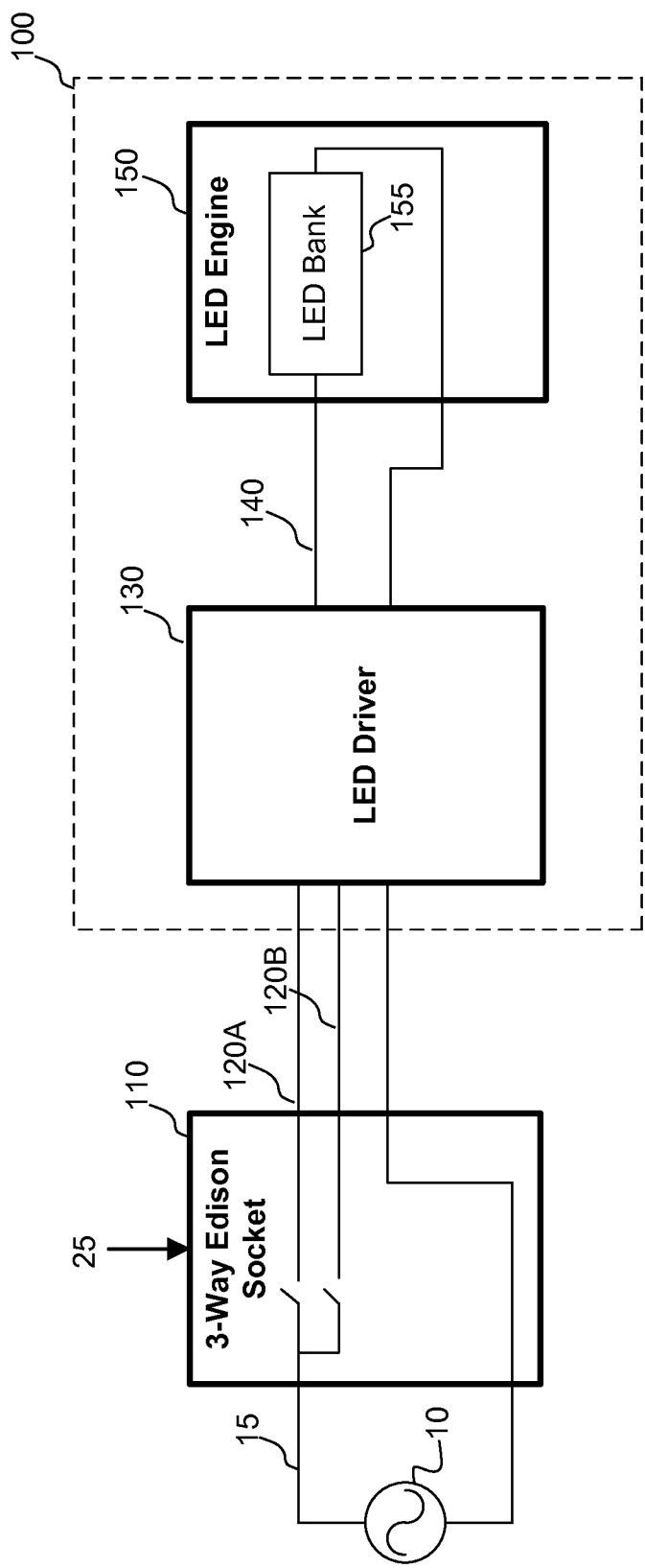
FIG. 1 illustrates an LED lighting fixture circuit according to one embodiment.

FIG. 1 illustrates an LED lighting fixture system including LED lighting fixture 100 interfacing with a conventional three-way Edison socket 110. LED lighting fixture 100 according to various embodiments is a direct replacement of a three-way incandescent lighting fixture in a conventional three-way lighting setting. The three-way socket 110 is connected to AC input voltage source 10 and LED lighting fixture 100. Three-way socket 110 receives AC input voltage signal 15 and selects one or both lighting fixture input lines 120 in response to lighting level control input signal 25. In other words, the three-way socket 110 controls the light intensity outputted by LED lighting fixture 100 by selecting which input voltage line 120 (or both) to be applied to LED lighting fixture 100 in response to control input signal 25. The LED lighting fixture 100 controls the light output intensity of LED lighting fixture 100 to vary in response to the activation of one or both input lines 120, exhibiting behavior similar to three-way incandescent lighting fixtures. Lighting level control input signal 25 can be provided in a variety of ways, for example manually (via a knob or switch, not shown herein) or via an automated lighting control system (not shown herein).

As illustrated in FIG. 1, LED lighting fixture 100 includes LED driver 130 and LED engine 150. LED engine 150 includes LED bank 155, comprising one or more LEDs. LED driver 130 detects whether input line 120A or 120B, or both, are active, and provides drive current 140 to LED engine 150 based on the detected input line 120. LED driver 130 drives LED engine 150 based on the detected input line 120 to achieve the desired light intensity, as will be described in more detail below.

Figure 2:
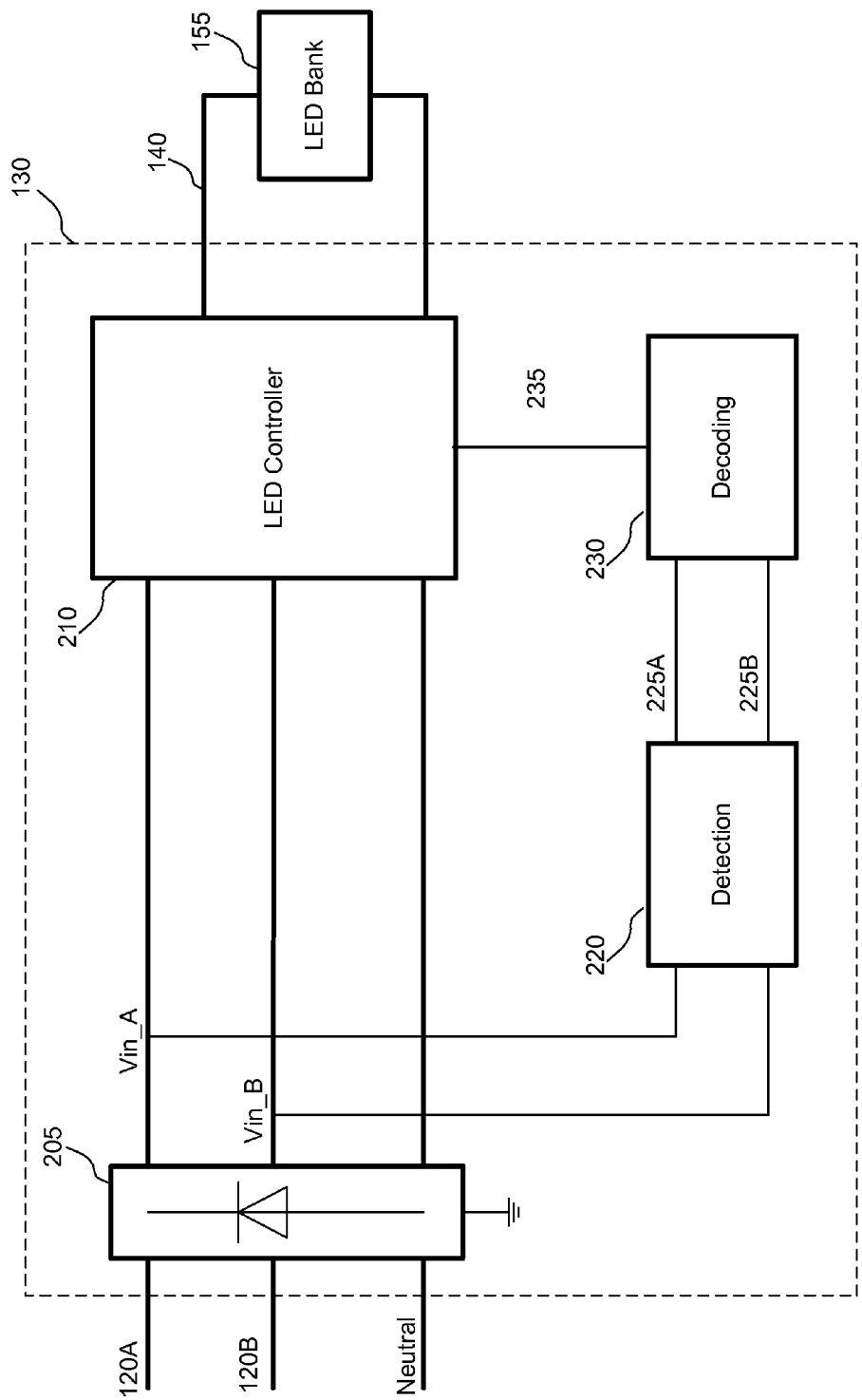
FIG. 2 is a block diagram illustrating an LED driver, according to one embodiment.

FIG. 2 is a block diagram illustrating details of the LED driver 130. In one embodiment, LED driver 130 includes bridge rectifier 205, LED controller 210, detection circuit 220, and decoding circuit 230. Those of skill in the art will recognize that other embodiments can have different modules than the ones described here, and that the functionalities can be distributed among the circuits or modules in a different manner. In addition, the functions ascribed to the various circuits or modules can be performed by multiple circuits or modules.

Rectifier 205 rectifies AC input voltage signals 120A and 120B and provides the rectified signals Vin_A and Vin_B to LED controller 210. Detection circuit 220 receives the rectified signals Vin_A and Vin_B and detects the voltages of the signals. Based on the detected voltages, detection circuit 220 provides detection signals 225A and 225B to decoding block 230.

Figure 3A:
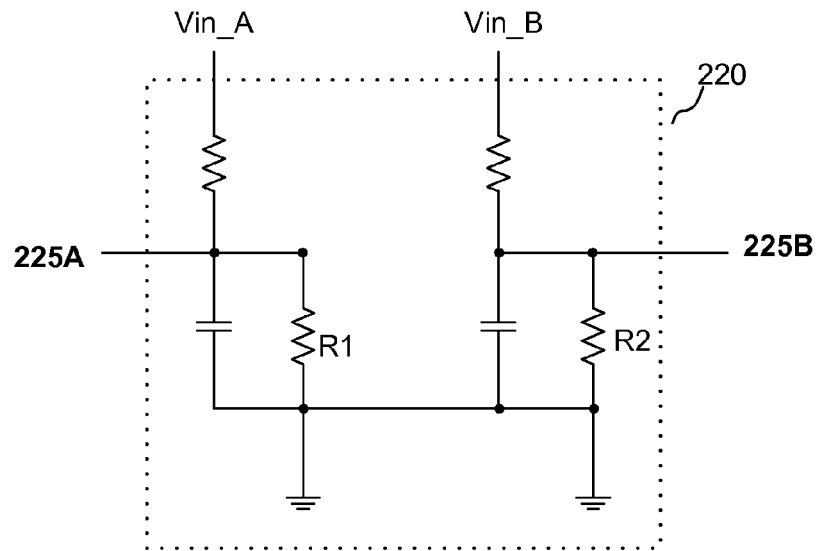
FIG. 3A illustrates a circuit of a detection unit, according to one embodiment.
Figure 3B:
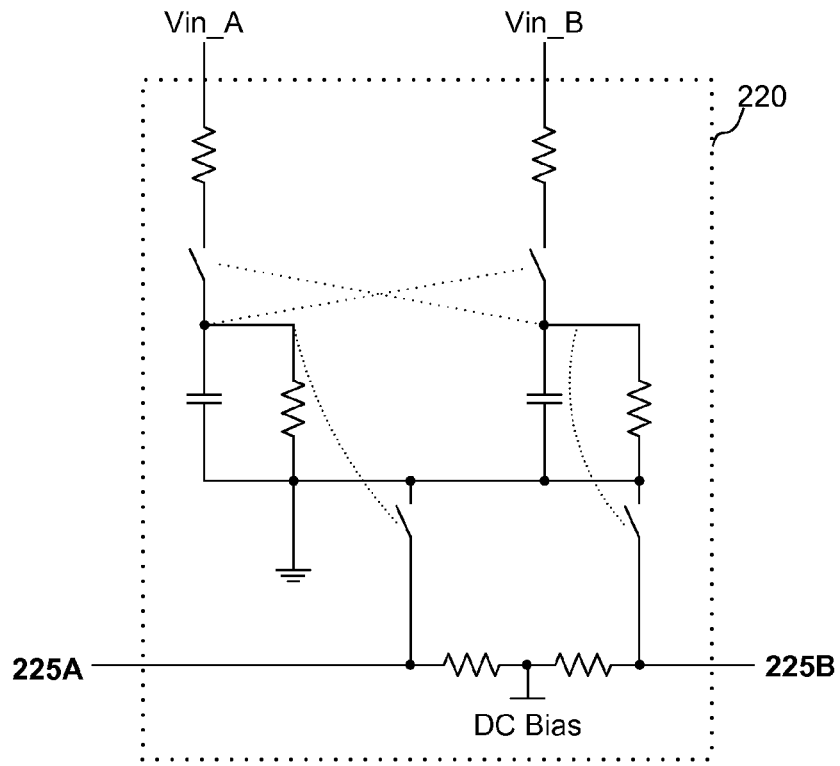
FIG. 3B illustrates an alternative circuit of a detection unit, according to one embodiment.

FIGS. 3A and 3B are circuit diagrams illustrating example configurations of detection circuit 220. In FIG. 3A, rectified input voltages Vin_A and Vin_B are input to a single-ended RC integrator with discharge resistors R1 and R2. First line detection signal 225A represents the voltage across R1, and second line detection signal 225B represents the voltage across R2. FIG. 3B illustrates a differential mode configuration of detection circuit 220. In FIGS. 3A and 3B, detection circuit 220 generates first line detection signal 225A that is proportional to Vin_A and second line detection signal 225B that is proportional to Vin_B. If an input voltage line has a magnitude greater than the magnitude of a threshold voltage, the input line is determined to be active. The magnitude of the threshold voltage may be selected based on the expected voltage of AC input voltage 15 and the desired precision for a particular application. For example, for an expected AC input voltage 15 of 120V (e.g., for North American applications), the line may be considered "active" when a detection signal 225 indicates that the corresponding input voltage line has a voltage above 70 volts. As another example, for an expected AC input voltage 15 of 230V (e.g., for applications in Europe), the line may be considered "active" when a detection signal 225 indicates that the corresponding input voltage line has a voltage above 160V. Other threshold voltage values may also be selected based on the desired application, for example to avoid crosstalk in the environment of the detection circuit 220. Moreover, other configurations for detection circuit 220 than those illustrated in FIGS. 3A and 3B are also possible. For example, detection circuit 220 may be implemented as a digital circuit in one embodiment.

Returning to FIG. 2, decoding circuit 230 receives the detection signals 225A and 225B from detection circuit 220 and generates control signal 235 based on the detection signals. Specifically, decoding circuit 230 identifies whether the input voltage lines 120 are active based on the output signals of detection circuit 220, and generates the control signal 235 for the LED controller 210 to drive the LEDs at the desired intensity level.

Figure 4A:
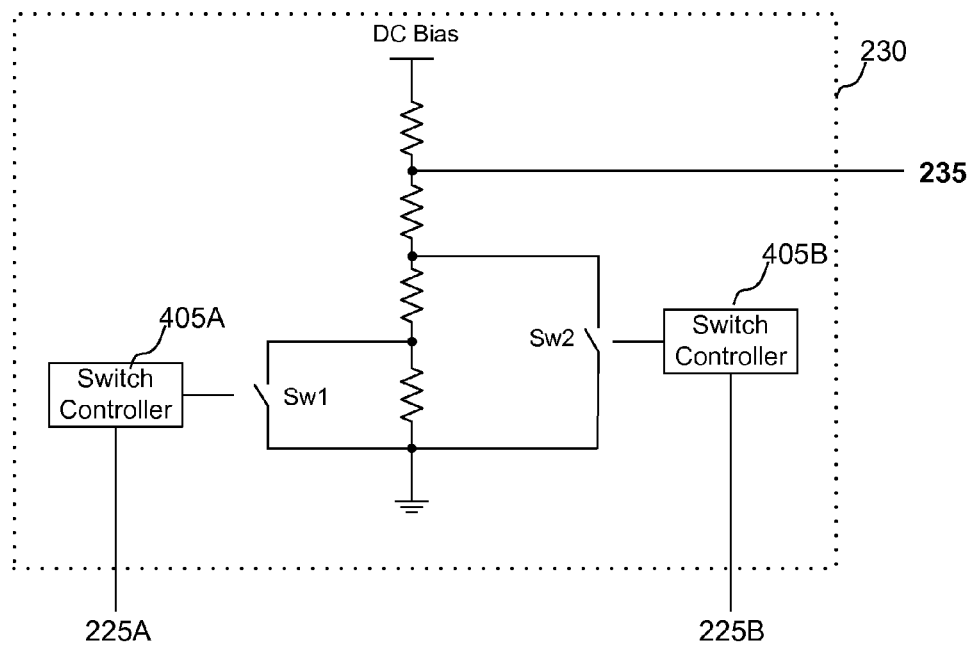
FIG. 4A illustrates a circuit of a decoding unit, according to one embodiment.
Figure 4B:
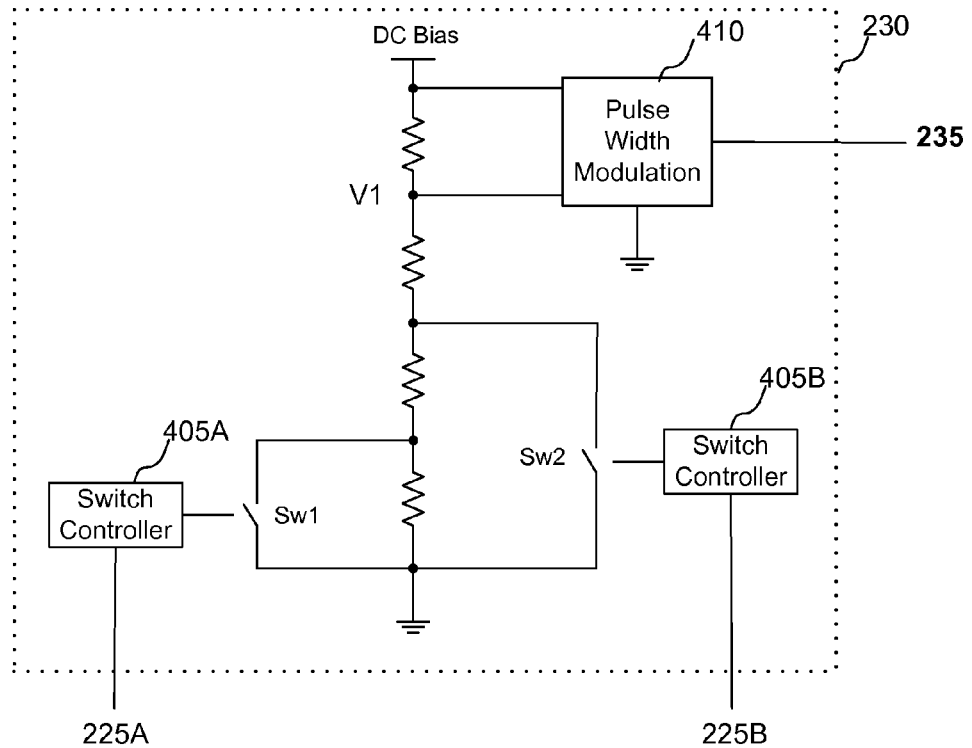
FIG. 4B illustrates an alternative circuit of a decoding unit, according to one embodiment.

FIGS. 4A and 4B illustrate example circuit diagrams of decoding circuit 230. In FIGS. 4A and 4B, decoding circuit 230 is configured as a resistance divider, in which different portions of the circuit may be shorted to ground depending on the state of switches Sw1 and Sw2. A DC bias for decoding circuit 230 may be provided by a low-dropout regulator coupled to an input voltage of the LED driver. Decoding circuit 230 may be configured to provide three values for control signal 235 corresponding to three states of decoding circuit 230: (1) Switches Sw1 and Sw2 both open (or both closed), (2) switch Sw1 open and switch Sw2 closed, and (3) switch Sw1 closed and switch Sw2 open.

In FIGS. 4A and 4B, detection signals 225A and 225B received from detection circuit 220 drive switch controllers 405A and 405B. The switch controllers 405A and 405B turn on or turn off corresponding switches Sw1 and Sw2 in response to the values of first line detection signal 225A and second line detection signal 225B. For example, switch controller 405A may turn on Sw1 responsive to first line detection signal 225A exceeding a threshold voltage. Similarly, switch controller 405B may turn on switch Sw2 responsive to second line detection signal 225B exceeding a threshold voltage. In another embodiment, switch controllers 405 may turn off switches Sw1 and Sw2 responsive to first line detection signal 225A and second line detection signal 225B, respectively, exceeding a threshold voltage. The threshold voltages may be selected based on the expected AC input voltage 15. For example, the threshold voltage may be selected such that switches Sw1 and Sw2 are turned on (or turned off) when detection signals 225 indicate that the input voltage lines 120 are connected to the AC voltage source 10.

The decoding circuit 230 illustrated in FIG. 4A generates DC voltage signal 235, the value of which depends on the on or off states of switches Sw1 and Sw2. In another embodiment, as illustrated in FIG. 4B, decoding circuit 230 generates pulse width modulation signal 235. Pulse width modulation (PWM) block 410 compares voltage V1 to the DC bias and generates a PWM pulse wave by, for example, delta modulation. Other configurations for decoding circuit 230 than those illustrated in FIGS. 4A and 4B are also possible. For example, decoding circuit 230 may be implemented as a digital circuit in one embodiment.

Returning again to FIG. 2, LED controller 210 provides constant output current 140 through LED bank 155 based on control signal 235 received from decoding circuit 230. LED controller 210 may be configured in a flyback topology, a buck topology, or other topologies known to those of skill in the art. LED controller 210 can employ any one of a number of well-known modulation techniques, such as pulse width modulation (PWM) or pulse frequency modulation (PFM), to control the output current 140 through the LED bank 155.

LED controller 210 controls output luminosity of the LEDs of LED bank 155 by providing different regulated output current to LED bank 155 based on control signal 235. In one embodiment, LED controller 210 is configured to select one of three current levels corresponding to the three values of control signal 235. For example, if the LED controller 210 is configured as a flyback power converter including a transformer and a switch for controlling current through a primary winding of the transformer, the LED controller 210 may regulate primary side current amplitude to each of three levels based on the control signal 235. Alternatively, the LED controller 210 may regulate output current 140 by controlling the switching frequency or duty cycle of the switch. The LED controller 210 may provide a first current level to the LED bank 155 (or a portion thereof) responsive to the control signal indicating that the input voltage line 120A is active and the input voltage line 120B is not active. A second current level may be provided to the LED bank 155 (or a portion thereof) responsive to the control signal indicating that the input voltage line 120B is active and the input voltage line 120A is not active. A third current level may be provided to the LED bank 155 (or a portion thereof) responsive to the control signal indicating that both input voltage lines are active.

In one embodiment, the third current level is equivalent to a sum of the first and second current levels to mimic conventional three-way incandescent bulbs, in which the highest light intensity level is a sum of the lower two intensity levels. However, in other embodiments, the third current level may be arbitrarily set to other levels; for example, different levels may be set for different applications. For example, the third current level may be greater than a sum of the first and second current levels, or may be less than a sum of the first and second current levels.

The LED lighting fixtures according to various embodiments have the advantage that the LED lighting fixture can be a direct replacement of conventional incandescent lamps and lighting fixtures in conventional three-way sockets that activate different input voltage lines to control light intensity from the lighting fixtures. Embodiments described herein provide three output light intensity levels without an extra wire connecting to the LED bank. Moreover, LED lighting fixtures as described herein provide uniform light distribution without a complicated distribution of LEDs or diffusing lens. Finally, the three light intensity levels of LED lighting fixtures as described can be arbitrarily set for their intended applications.

Upon reading this disclosure, those of skill in the art will appreciate still additional alternative designs for an LED lighting fixture. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the invention.

What is claimed is:

1. A light-emitting diode (LED) lighting fixture configured to receive signals from a first input voltage line and a second input voltage line, the LED lighting fixture comprising:
   an LED bank including one or more LEDs; and
   an LED controller configured to detect whether the first and second input voltage lines are active and to provide regulated current to the LED bank, the LED controller configured to:
      provide regulated output current at a first level to a first portion of the LED bank responsive to detecting the first input voltage line is active and the second input voltage line is not active; and
      provide a regulated output current at a second level to a second portion of the LED bank responsive to detecting the first and second input voltage lines are active, the second portion of the LED bank at least partially overlapping the first portion.

2. The LED lighting fixture of claim 1, further comprising:
   a detection circuit configured to detect whether the first and second input voltage lines are active and generate first and second detection signals, the first detection signal indicative of the first input voltage and the second detection signal indicative of the second input voltage; and
   a decoding circuit configured to receive the first and second detection signals and generate a control signal based on the first and second detection signals, wherein the LED controller is configured to detect whether the first and second input voltage lines are active based on the control signal.

3. The LED lighting fixture of claim 2, wherein the control signal has a first value responsive to the first detection signal indicating that the first input voltage line is active and the second input voltage line is not active and has a second value responsive to the first and second detection signals indicating that the first and second input voltage lines are active.

4. The LED lighting fixture of claim 1, wherein the second current level is greater than the first current level.

5. A method for controlling output light intensity of a light-emitting diode (LED) lighting fixture configured to receive signals from a first input voltage line and a second input voltage line, the method comprising:
   detecting whether the first and second input voltage lines are active;
   providing regulated output current at a first level to a first portion of the LED bank responsive to detecting the first input voltage line is active and the second input voltage line is not active; and
   providing a regulated output current at a second level to a second portion of the LED bank responsive to detecting the first and second input voltage lines are active, the second portion of the LED bank at least partially overlapping the first portion.

6. The method of claim 5, further comprising:

generating a first and a second detection signal, the first detection signal indicative of the first input voltage and the second detection signal indicative of the second input voltage; and generating a control signal based on the first and second detection signals, wherein detecting whether the first and second input voltage lines are active comprises detecting whether the first and second input voltage lines are active based on the control signal.

7. The method of claim 6, wherein the control signal has a first value responsive to the first detection signal indicating that the first input voltage line is active and the second input voltage line is not active and has a second value responsive to the first and second detection signals indicating that the first and second input voltage lines are active.

8. The method of claim 5, wherein the second current level is greater than the first current level.

* * * * *